United States Patent [19]

Plagnard

[11] 4,440,718
[45] Apr. 3, 1984

[54] FUEL ASSEMBLY TRANSFER DEVICE FOR BREEDER NUCLEAR REACTOR

[75] Inventor: André Plagnard, Montrouge, France

[73] Assignee: Novatome, Le Plessis, France

[21] Appl. No.: 291,679

[22] Filed: Aug. 10, 1981

[30] Foreign Application Priority Data

Sep. 22, 1980 [FR] France ............................. 80 20344

[51] Int. Cl.³ .......................................... G21C 19/22
[52] U.S. Cl. .................................. 376/269; 376/270; 376/272
[58] Field of Search ............... 376/270, 460, 262, 269, 376/272

[56] References Cited

U.S. PATENT DOCUMENTS

| | | | |
|---|---|---|---|
| 3,089,836 | 5/1963 | Wooton | 376/270 |
| 3,962,032 | 6/1976 | Berniolles et al. | 376/270 |
| 4,069,098 | 1/1978 | Wade | 376/270 |
| 4,096,031 | 6/1978 | Wade | 376/270 |

OTHER PUBLICATIONS

Nuclear Eng. Int., vol. 22, No. 257, (5/77), pp. 41–45, Banal.

*Primary Examiner*—Sal Cangialosi
*Attorney, Agent, or Firm*—Pollock, Vande Sande & Priddy

[57] ABSTRACT

A dismountable and movable device for the transfer of fuel assemblies for a breeder nuclear reactor, comprising a platform (11) mounted for rotation on a support (12) resting on the structure of the reactor. The platform is provided with apertures (19, 20) and carries a hopper (23) which can contain a fuel assembly (5) in vertical position, at the level of one of the apertures (19). The apertures can be brought into correspondence with vertical shafts (14, 15) permitting access to storage (5a) and evacuation (5b) positions for the assemblies (5). The hopper (23) contains a winch (37) for the vertical displacement of the assemblies in the hopper and the shafts when they are in correspondence. The shafts and the platform comprise complementary connecting and sealing devices to assure the connection between the hopper and the shafts. The device is particularly useful for reactors grouped on one and the same site where transport of the assemblies is effected by modules displaced on the site.

4 Claims, 3 Drawing Figures

FUEL ASSEMBLY TRANSFER DEVICE FOR BREEDER NUCLEAR REACTOR

FIELD OF THE INVENTION

The invention relates to a device for the transfer of fuel assemblies for a fast neutron reactor, between a storage position adjacent to the tank of the reactor and a position for the evacuation and introduction of these assemblies.

BACKGROUND

Fast neutron reactors cooled with liquid sodium comprise a tank of large dimensions inside which is disposed the reactor core consisting of fuel assemblies immersed in the liquid sodium.

In order to effect the recharging of the reactor core with fuel assemblies, it is necessary to remove the irradiated fuel assemblies from the tank, then to dispose them in a transport cask, generally after a more or less long period of storage during which the radioactivity of these fuel assemblies diminishes, for their evacuation to a reprocessing unit.

Parallel to this evacuation of these irradiated assemblies, new assemblies are introduced into the nuclear reactor in the charging zone of the core where a transfer machine can pick them up to dispose them inside the core in place of the irradiated assemblies.

A transfer machine is therefore available, situated above the core, enabling the assemblies to be removed from or introduced into the core and to be disposed in a storage zone disposed in the reactor tank.

On the other hand, a transfer assembly is available comprising two inclined ramps and a loading-unloading lock which enables the fuel assemblies to be transported between the reactor tank containing the core and a storage zone close to this tank where the assemblies can remain for a more or less extended time during which their radioactivity decreases.

For their passage from the storage zone to the transport cask, the fuel assemblies must be picked up by a complex handling and packaging assembly comprising travelling cranes or other handling machines.

This complex assembly is installed in a part of the reactor specially provided for this purpose, thereby increasing the overall size and the cost of construction of the reactor building.

On the other hand, it is at present being considered, for the installation of fast neutron nuclear reactors, to group a plurality of reactors on one and the same site, so as to facilitate shared use of certain subsidiary installations or items of equipment of these reactors.

In the case of reactors grouped on one and the same site, the device for the transfer and storage of fuel assemblies as described in French Patent Application No. 80-02862 of the NOVATOME company is of great interest because it simplifies considerably the total of the devices necessary for the evacuation of the irradiated assemblies towards a reprocessing factory and for supplying the reactor with new assemblies.

This device comprises, in particular, modules for the transfer and storage of the fuel assemblies, carried by transport vehicles travelling on the site where the reactors are installed.

Nevertheless, in the case where an intermediate storage of the fuel assemblies is necessary after their removal from the reactor tank and before they are picked up by the transfer and storage modules, it is necessary to have available special installations integrated with the building of the reactor for the passage of the fuel assemblies between their storage position in the vicinity of the reactor tank and an evacuation position from which the assemblies can be picked up by the transfer module.

SUMMARY OF THE INVENTION

It is therefore the object of the invention to provide a transfer device for fuel assemblies for fast neutron nuclear reactors between a storage position in the vicinity of the reactor tank and an evacuation and introduction position from which the evacuation of the irradiated assemblies and the supplying of the reactor with new assemblies is effected, and this device should permit a simplification of the structure of the reactor and common use by other reactors disposed on the site.

For this purpose, the transfer device according to the invention is dismountable and movable as a whole for its successive use with a plurality of nuclear reactors and comprises:

a platform mounted for rotation, with the interposition of a joint, on a support adapted to rest on the structure of the reactor, the platform, pierced by at least one aperture, then being horizontal and movable about a vertical axis so as to bring the aperture successively into concordance with vertical shafts giving access to the storage and evacuation positions of the assemblies formed in the structure of the reactor and equipped, at their upper portion, with closing and connection devices, at least one hopper capable of containing an assembly in the vertical position, disposed on the upper surface of the platform round the aperture formed therein and equipped with a winch for the vertical displacement of the assemblies inside the shafts and the hopper when these come into the extension of one another by rotation of the platform, and at least one connecting device carried by the platform for the connection between the hopper and the shafts when these come into concordance.

In order that the invention may be more clearly understood, two embodiments of a device according to the invention, used on a fast neutron nuclear reactor, will now be described by way of non-limiting example, with reference to the accompanying drawings.

DETAILED DESCRIPTION

Figure 1:
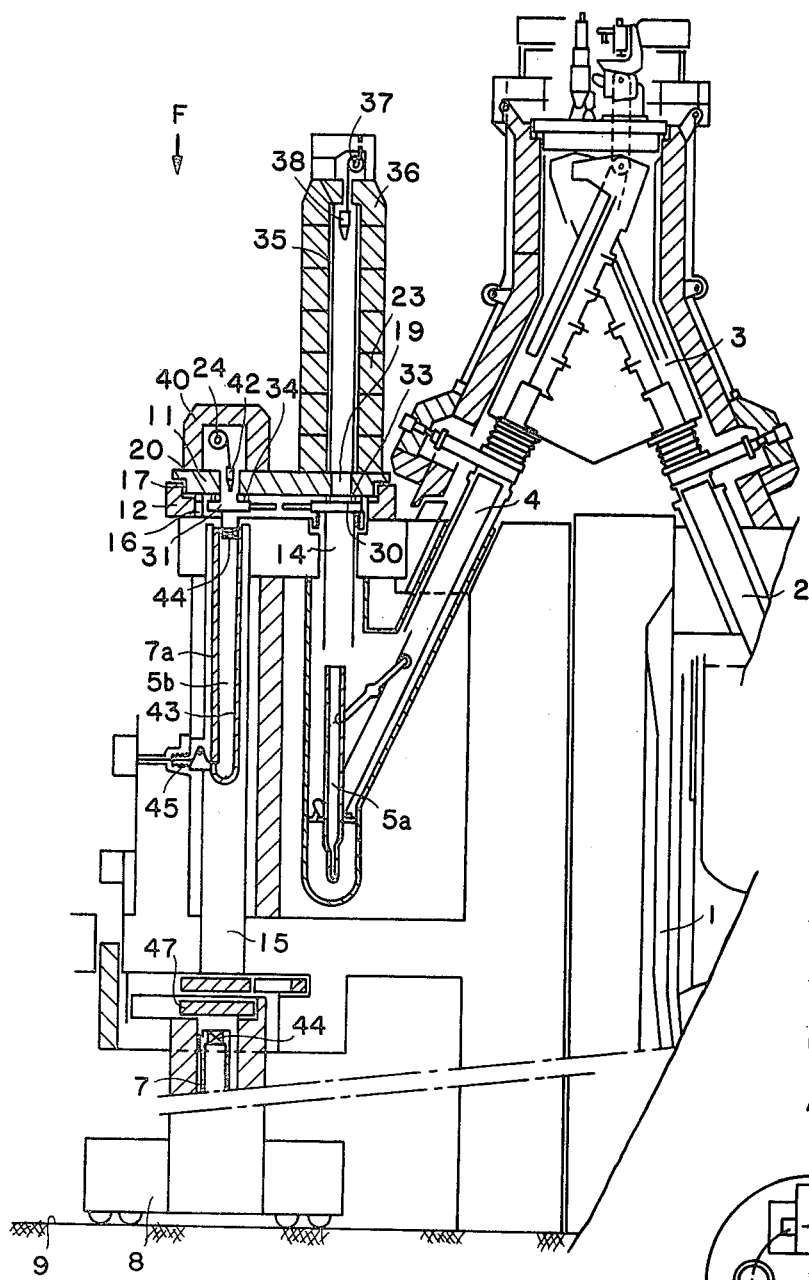
FIG. 1 illustrates, in a broken view in section on A—A in FIG. 3, a chain for handling the fuel assemblies comprising a transfer device according to the invention and in which the fuel assemblies are transferred from the end of the secondary ramp of the loading-unloading lock to a transfer module.

FIG. 1 shows the tank 1 of the nuclear reactor enclosing the core of this to the interior there penetrates the primary ramp 2 communicating with the loading-unloading lock 3 permitting the passage of the fuel assemblies from the priary ramp 2 to the secondary ramp 4 to bring the fuel assembly 5 into its intermediate storage position 5a at the base of the secondary ramp 4.

The movable transfer device according to the invention enables the assembly 5 to be caused to pass from its intermediate storage position 5a to a position 5b inside a transfer module 7 in the evacuation position.

The movable transfer device according to the invention further enables the module 7 to be disposed inside the transport truck 8 displaced on a rolling track 9 at the lower part of the structure of the reactor.

The transfer device comprises a revolving platform 11 mounted for rotation about a vertical axis on a support 12 resting on the structure of the reactor above access shafts 14 and 15 formed in the structure of the reactor vertically in line with the storage position 5a for the fuel assemblies at the base of the secondary ramp 4 and vertically in line with the loading position for the transfer module.

The platform 11 is mounted for rotation on the support 12 by means of a ball bearing 16, and a sealing device 17 enables the space situated below the platform and in communication with the shafts formed in the structure of the reactor to be isolated from the outside atmosphere.

Figure 3:
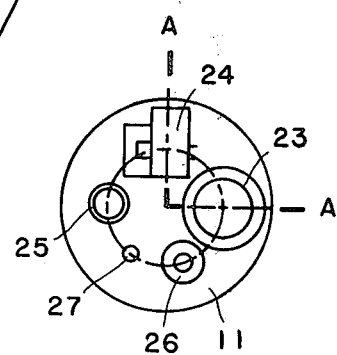
FIG. 3 illustrates a view along F in FIG. 1 or FIG. 2.

The platform 11 is pierced with apertures such as 19 and 20 visible in FIG. 1 and carries an assembly of devices visible in FIGS. 1 and 3.

Each of these devices is placed straight above an aperture such as 19 and 20 traversing the platform 11 and bringing the device into communication with one of the vertical shafts 14 and 15 formed in the structure of the reactor, according to the position of the platform in relation to these vertical shafts.

In fact, the displacement of the platform in rotation about its vertical axis of rotation enables the various apertures and the various devices to be brought successively into concordance with the vertical shafts 14 and 15. The devices carried by the platform 11 comprise a hopper 23 for the irradiated assemblies, a module winch 24, a hopper 25 for the new assemblies and a device 26 for opening and closing the modules.

Moreover, an aperture is provided for the passage of a periscope 27 permitting the observation of the transported assemblies with a view to their identification and their orientation before introduction into the reactor.

A motor device, not illustrated, enables the platform 11 to be caused to rotate about its axis to bring the various apertures corresponding to the devices 23,24,25,26 and 27 into coincidence with the upper portion of the shafts 14 and 15.

At their upper portion, the shafts 14 and 15 are closed by valves 30 and 31, respectively, while the lower portion of the platform 11 carries connection devices such as 33 and 34 consisting of a device comprising a seal adapted to come into a connecting position on the upper face of the valve 30 or 31.

In this manner, when the platform is in the position illustrated in FIG. 1, the hopper 23 for the irradiated assemblies and the module winch 24 being in position above the shafts 14 and 15 respectively, the connecting devices 33 and 34 permit a sealed connection between the interior of the hopper 23 or the interior of the housing of the winch 24 and the vertical shafts 14 and 15 disposed straight above the storage and evacuation positions for the assembly 5.

The hopper for irradiated elements 23 consists of an internal tubular casing 35 covered by a protective casing 36 inside which there is disposed, in its upper portion, a winch 37 permitting the vertical displacement of the assembly 5 in the space constituted by the hopper and the shaft 14, when the valve 30 is open.

Pincers 38 disposed at the end of the cable of the winch enable the fuel element 5 to be caught in the position 5a and raised inside the hopper 23, the height of which is adapted so that it can contain an assembly 5.

The hopper for new assemblies 25 is identical to the hopper 23 except that it does not comprise a thick wall for protection against radiation similar to the thick wall 36.

The module winch 24 is disposed inside a case 40, the thick wall of which permits insulation against radiation.

Handling pincers 42 fixed to the end of the cable of the winch permit catching of the modules 7 for their displacement inside the shaft 15 into their loading position inside the transport truck 8.

The modules 7 comprise a casing 43 of sufficient dimensions to contain a fuel assembly, closed by a stopper 44, the opening and closing of which may be effected by the tool associated with the device 26 for opening and closing the modules.

The operation of the device according to the invention is as follows:

Before effecting a transfer operation, the device is brought into its position of service in which the support 12 rests on the structure of the reactor in such a manner that the module winch is above the shaft 15.

The support 12 is fixed to the structure of the reactor by means of movable fixing devices and the platform is brought into the position illustrated in FIG. 1 by means of its displacement device.

Simultaneously, the module, which then contains a new assembly, is brought by the displacement truck 8 below the vertical passage 15 then into its position 7a where it is held in position by a locking device 45, by the module winch 24 and its gripping element 42.

The module is then opened.

The platform 11 is then turned through 90° to bring the hopper 23 above the shaft 14 and the hopper 25 above the shaft 15.

The new assembly contained in the module at 7a and the irradiated assembly placed in the position 5a are raised simultaneously in each of the hoppers.

The platform 11 then turns through 180° in such a manner as to bring the irradiated assembly straight above the shaft 15 and the new assembly straight above the shaft 14.

The two assemblies are then lowered again, the irradiated assembly into the module at 7a and the new assembly at 5a. The latter can be replaced in the reactor by means of the ramps.

A fresh rotation through 90° of the platform 11 will bring the module winch back straight above the passage 14. The module is closed again. It can then be replaced, by means of this winch, in the truck 8 which will evacuate it from the reactor.

Figure 2:
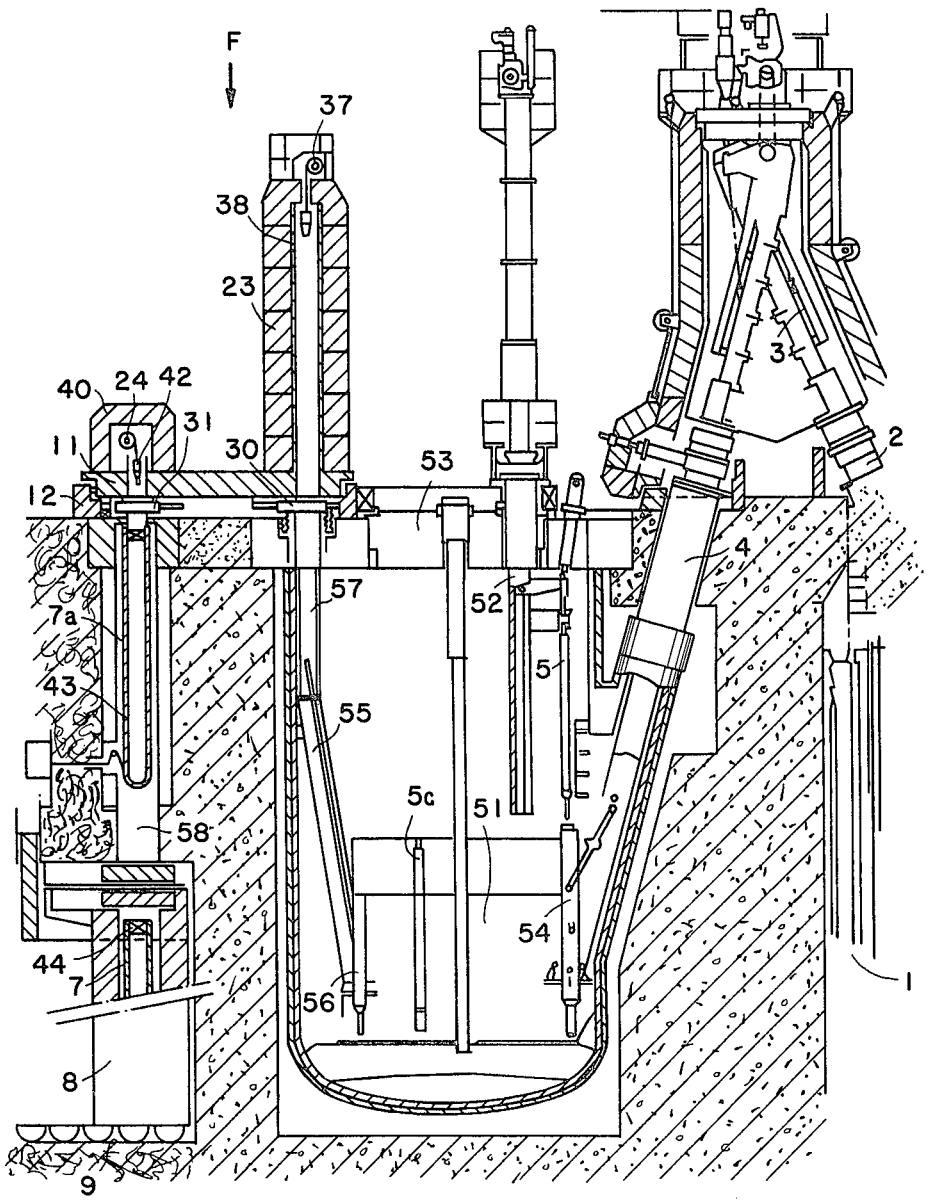
FIG. 2 illustrates, in a broken vertical section on A—A of FIG. 3, a chain for handling fuel assemblies comprising a transfer device according to the invention and in which the fuel assemblies are transferred from an intermediate storage capacity to a transfer module.

The chain for handling the fuel assemblies illustrated in FIG. 2 is identical to the chain illustrated in FIGS. 1 and 3, except that a tank for the intermediate storage of the irradiated assemblies 51 is disposed in the vicinity of the tank 1 reactor for the storage of a large number of irradiated assemblies after their extraction from the core and their removal from the reactor tank for the decay of their radioactivity.

The secondary ramp 4 leads into the storage tank 51, where a handling device 52 permits the extraction of the assembly 5 from the transport container 54 of the ramp 4 and the transport of the irradiated assembly 5 into a position 5c in the storage structure for the assemblies disposed inside the tank 51.

The storage structure for the assemblies is fixed and the handling device 52 is installed on a rotating stopper 53 rigidly connected to a drive device for setting in rotation (not shown).

In this manner, all the storage positions of this structure can be filled by means of the handling device 52 and the rotating stopper 53 of the device 51.

A ramp 55 ends at its lower portion at the level of the storage structure for the irradiated assemblies. A storage case 56 is articulated to the end of this ramp.

The assemblies 5 in the storage position 5c can be placed, by means of the handling tool 52, in the case 56 inside which they can be picked up by the gripping tool 38 of the winch 37 of the hopper for irradiated fuel assemblies 23.

The transfer device according to the invention, disposed above the vertical shafts 57 and 58 communicating, respectively with the ramp 55 and with the loading position of the transfer carriage 8, can therefore effect the transfer of the irradiated fuel elements between the storage tank 51 and the module 7 in the position 7a in the passage 58.

The other functions already described for the device illustrated in FIG. 1 can likewise be effected by the transfer device illustrated in FIG. 2.

The storage tank 51 permits an intermediate storage of the assemblies, between their removal from the reactor tank and their transport by means of the module 7 and the truck 8, for a sufficiently long time for the radioactivity of these assemblies to decay by an important amount.

Since the support 12 on which the platform 11 is disposed is movable in relation to the structure of the reactor, the whole of the transfer device can be transported from one place to another on the structure of the reactor at the level of shafts communicating with storage positions and evacuation positions for the fuel assemblies. In the case where a plurality of nuclear reactors are disposed on one and the same site, the transfer device can be used equally well on one or the other of the reactors. This shared use of the transfer device enables both the cost of construction of the nuclear reactors and the time elapsing between two successive uses of the transfer device to be reduced, which increases the reliability of the transfer chain for the assemblies.

On the other hand, the transfer device according to the invention enables elimination of a complex assembly integrated with the structure of the reactor which increases its overall size and cost of construction.

The invention is not limited to the forms of embodiment which have been described; on the contrary, it comprises all the modifications.

Thus, while the device described is adapted to the case where the transfer of the fuel assemblies takes place inside modules which can be placed on transport trucks, it is equally possible to use it where such modules are not used.

In such case, the platform might carry only one hopper for irradiated assemblies and one hopper for new assemblies, or even possibly a single hopper for the transfer of the assemblies.

It is likewise possible to imagine other devices carried by the platform to effect handling or special work on the assemblies and their transport containers.

In short, although the transfer device according to the invention is particularly well adapted to the case of an assembly of fast neutron nuclear reactors grouped on one and the same site, it is likewise possible to use it for the operation of an isolated fast neutron nuclear reactor.

I claim:

1. A device for the transfer of fuel assemblies for a breeder nuclear reactor between a storage position external and adjacent to the reactor vessel and a position for evacuation and introduction from which the evacuation of irradiated assemblies and the supplying of the reactor with new assemblies is effected, comprising
    (a) a support adapted to rest on the structure of said reactor laterally of said reactor vessel above two access shafts formed in said structure vertically in line with said storage position and with said position for evacuation, respectively, said support being fixed on said structure by means of dismountable fixing devices;
    (b) a platform mounted horizontally and movable in rotation about a vertical axis on said support with the interposition of a sealing joint and pierced by at least one aparture situated so as to be brought in concordance successively with the upper parts of each of said access shafts by rotation of said platform;
    (c) at least one hopper able to contain a fuel assembly in vertical position and disposed on the upper surface of said platform round the aperture formed therein, said hopper being equipped with a winch for the vertical displacement of said assembly; and
    (d) corresponding connecting devices, disposed, respectively, on the lower surface of said platform round the aperture and on the upper parts of the access shafts.

2. A transfer device according to claim 1, in the case where the transport of the fuel assemblies takes place in modules (7) carried by transport trucks (8), wherein said platform further carries a winch for handling said modules and means for opening and closing said modules.

3. A transfer device according to claim 1 or 2, wherein said platform further carries a second hopper, said hopper being provided for said irradiated assemblies and comprising a thick protective casing against radiation, said other hopper being provided for said new assemblies.

4. A transfer device according to claim 1 or 2, wherein, in the storage position, said fuel assemblies are inside a large capacity intermediate storage structure for said irradiated assemblies.

* * * * *